United States Patent

[11] 3,598,417

| [72] | Inventor | Peter A. Mueller<br>Oak Park, Ill. |
|---|---|---|
| [21] | Appl. No. | 843,893 |
| [22] | Filed | June 19, 1969 |
| [45] | Patented | Aug. 10, 1971 |
| [73] | Assignee | Mueller Seal Company<br>Lyons, Ill.<br>Continuation-in-part of application Ser. No. 748,131, July 15, 1968, now abandoned, which is a continuation-in-part of application Ser. No. 600,418, Dec. 9, 1966, now abandoned. |

[54] NONFRICTION SEAL
7 Claims, 9 Drawing Figs.

[52] U.S. Cl. .................................................. 277/74,
  277/75, 188/218, 277/72, 277/88
[51] Int. Cl. .................................................. F16j 15/16,
  F16j 15/40
[50] Field of Search .......................................... 277/70-
  —75, 88, 90, 92, 9

[56] References Cited
UNITED STATES PATENTS

| 2,902,301 | 9/1959 | Daeschner | 277/74 |
|---|---|---|---|
| 2,907,594 | 10/1959 | Macks | 277/74 X |
| 2,981,490 | 4/1961 | Comey | 277/72 X |
| 1,315,822 | 9/1919 | Doran | 277/74 |
| 1,803,510 | 5/1931 | Schmieding et al. | 277/90 |
| 2,127,591 | 8/1938 | Evans | 277/88 X |
| 2,790,523 | 4/1957 | Fawich et al. | 188/218 A |
| 2,895,751 | 7/1959 | Standish | 277/74 X |
| 3,186,255 | 1/1965 | Schmitter et al. | 217/42 X |
| 3,203,704 | 8/1965 | Mueller | 277/90 X |

*Primary Examiner*—Samuel Rothberg
*Attorney*—Hood, Gust, Irish, Lundy & Coffey

ABSTRACT: A seal comprising mating parts yieldably biased to mutual sealing contact but including means for introducing fluid under pressure between said parts to separate said parts, to establish a flowing-fluid barrier against entry of foreign materials between said parts and to establish and maintain a superatmospheric pressure in a chamber bounded by said parts. In a preferred form of the invention, one of said mating parts is a lipped washer capable of a hinging action and readily removably supported in the assembly. In some applications means may be provided for periodically scavenging from said chamber fluent material which may accumulate therein.

INVENTOR.
PETER A. MUELLER
BY
Hood, Gust & Irish
ATTORNEYS

INVENTOR.
PETER A. MUELLER
BY
Hood, Gust & Irish
ATTORNEYS

INVENTOR.
PETER A. MUELLER

BY

Hood, Gust, Irish & Lundy
ATTORNEYS 3,598,417

NONFRICTION SEAL

This is a continuation-in-part of my copending application Ser. No. 748,131 filed July 15, 1968, now abandoned, which, in turn, was a continuation-in-part of my then copending application Ser. No. 600,418 filed Dec. 9, 1966 for Nonfriction Seal, since abandoned.

The present invention relates to a nonfriction seal, and is primarily concerned with the provision of means for establishing between two parts a seal of such character as to prevent the entry of foreign material to a region which is bounded by the seal, the seal being of such character that, at times, contact between the seal parts can be eliminated, so that the seal parts may be relatively movable without the creation of friction therebetween, while maintaining an effective barrier against such entry of foreign material.

The seal of the present invention finds its primary utility in vehicle wheel assemblies and particularly for the protection of brake elements against moisture, grit and the like; and therefore it has been illustrated, and will be herein described, in that environment. However, it will be understood that the seal may be used in analogous, or in radically different, environments and that many of its advantages will be utilized even in situations in which there may be no significant motion between the elements with which the seal parts are associated.

According to the present invention, the seal comprises essentially two mating elements having cooperative sealing faces, resilient means normally biasing said elements into mutually sealing contact and means effective, at times, to introduce fluid under pressure between said sealing faces to overcome said bias, to separate said faces and at the same time to establish a flowing-fluid barrier against the entry of foreign material between the separated faces. When the seal is used to protect brake means in a vehicle wheel assembly, the mutually coactive seal elements circumscribe the brake parts to define a chamber in which said brake parts are enclosed; and when the complete assembly is in equilibrium condition, the seal parts cooperate mechanically to close that chamber effectively to bar access even of atmospheric moisture or water under static pressure to the interior of the brake-enclosing chamber. Suitable means is provided to establish and maintain a reservoir of fluid (preferably air) under superatmospheric pressure; and when the vehicle is to move, such fluid is so introduced into the seal assembly as to separate the cooperative seal parts, one of which is rotatable with one of the brake parts and the other of which is fixed to a nonrotating brake part, so that the seal elements are not subjected to friction as one rotates relative to the other. The mode whereby such fluid under pressure is caused to separate the seal parts is such as concurrently to establish and to maintain a flow of such fluid radially away from the seal parts; and that flowing fluid prevents the entry of moisture, water, grit or other foreign material, against the current of flowing fluid, into the space between the separated seal parts or into the chamber bounded by the seal.

The object of the present invention, then, is to provide seal means which will effectively protect a defined region, and anything enclosed within that region, even though one element of the seal means must rotate relative to its mate, without producing friction between the seal elements.

An unavoidable incident to the use of friction-type brake means is erosion of one or both cooperative elements thereof. Thus, in a brake assembly for a vehicle wheel, according to conventional practice, an erodible lining is used, and the lining material breaks down, over a period of use, into a discrete, fluent dust. A further object of the present invention is to provide, when one disclosed form of the seal is used in such an environment, means whereby such dust will be periodically scavenged from the chamber within which the brake assembly is enclosed. In other environments in which the said form of seal may be used, other fluent materials may require periodic scavenging; and it is an object of the invention to provide for scavenging of such other materials, whatever they may be. In another disclosed form of the seal, such scavenging is found to occur inherently and substantially continuously so that significant accumulation does not arise and the provision of special scavenging means is unnecessary.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
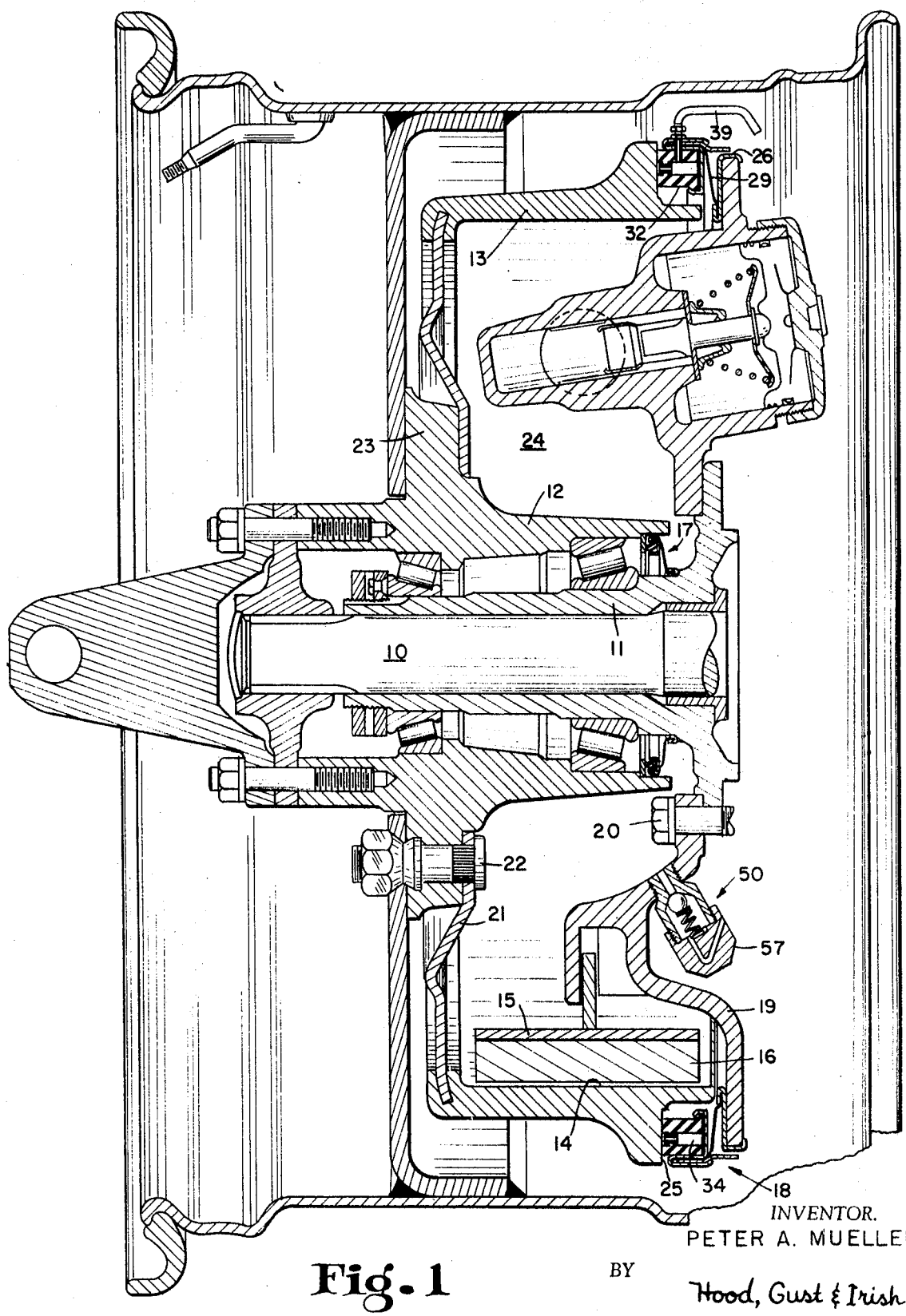
FIG. 1 is a section through a conventional form of wheel, stub axle and brake assembly, illustrating one form of my nonfriction seal in use therein.
Figure 2:
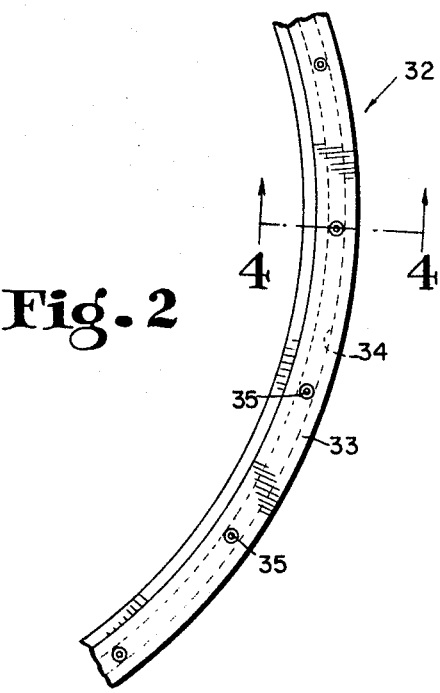
FIG. 2 is a fragmentary face view of an element of the seal.
Figure 3:
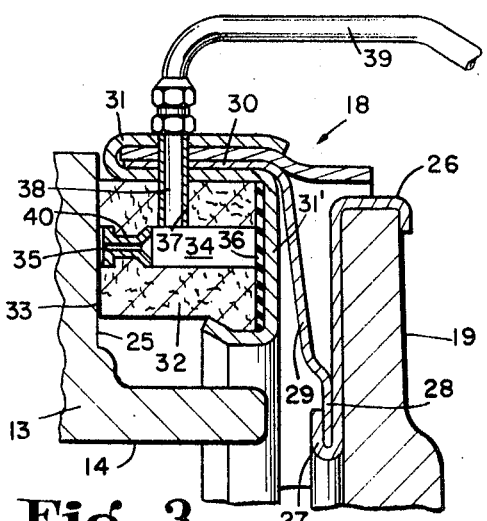
FIG. 3 is a fragmentary section, taken in the plane of FIG. 1, drawn to an enlarged scale and illustrating the portion of the seal means which is shown in the upper right-hand corner of FIG. 1.
Figure 4:
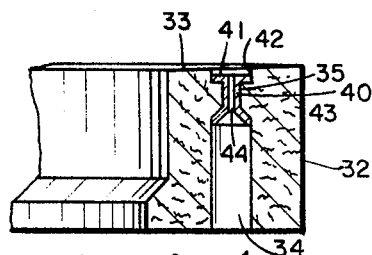
FIG. 4 is a similar fragmentary section of a washer constituting an element of my seal, taken upon a radial plane spaced from the plane of FIG. 3.
Figure 5:
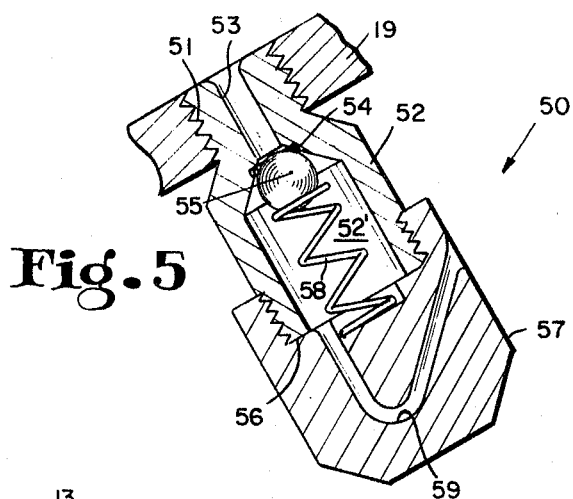
FIG. 5 is an enlarged section illustrating a preferred form of scavenging valve associated with a fragment of a mounting ring.

In the embodiment of my invention illustrated in FIG. 1—5, I have shown a fragment of an axle 10 upon which is nonrotatably supported a sleeve 11. A wheel hub 12 is rotatably supported on said sleeve 11. A wheel hub 12 is rotatably supported on said sleeve 11 through suitable bearing means and a brakedrum 13 is concentrically carried on said hub by means, for instance, of a plate 21 secured to a flange 23 on said hub by rivets 22. Brakeshoes 15 provided with linings 16 of erodible material are mounted, in accordance with conventional practice, for selective frictional engagement with the internal surface 14 of the brakedrum 13, said shoes being supported from a mounting ring 19 secured by machine screws 20, for instance, to the sleeve 11. Suitable seal means 17, desirably of the precise construction illustrated, between the sleeve 11 and the hub 12, together with my nonfriction seal means indicated generally by the reference numeral 18, cooperate with the parts heretofore described to define a housing including mating parts 13 and 19, one of which is coaxially rotatable relative to the other, and bounding a chamber 24 fully enclosing the shoes 15 and the cooperating brake drum surface 14.

The outer rim of the brakedrum 13 is formed to provide a truly flat, planar sealing face 25. In opposition to said face, there is mounted on the rim of the ring 19 a carrier means 26. Preferably, said carrier means is continuously annular; though in some instances it may comprise a plurality of separate, peripherally spaced clips. At any rate, said carrier means is formed to provide, at its radially inward rim, a rebent portion 27 gripping and supporting the inner rim portion 28 of a frustoconical spring 29, the outer rim portion 30 of which supports a seat ring 31 which is formed to provide an annular floor 31' upon which is mounted an annular washer 32. The spring 29 is so proportioned and designed that, when the parts are in assembled condition, said spring is flexed from its equilibrium condition so that it constantly yieldably urges its floor portion 31' toward the brakedrum surface 25, thus pressing the sealing face 33 of the washer 32 against said sealing face 25 of the brakedrum 13.

The washer 32 is formed, in any suitable manner, from material of 100 percent density. In the illustrated embodiments of the invention, I have found conventional brake lining material to be highly adaptable for this purpose. The face 33 of the washer 32, in use, should conform quite accurately to the sealing face 25 of the brakedrum. I have found that, preferably, the washer should initially be formed with its face 33 inclined radially inwardly and away from the plane of the face 25 at an angle of not more than 0°— 15' and that, after initial assembly, the parts should be "run in" with the spring 29 pressing the face 33 against the face 25 whereby a peripheral area of the face 33 of significant radial width will be caused to conform precisely to the face 25.

Opening through that face of the washer 32 which is remote from the sealing face 33, there is provided a peripherally continuous plenum space 34; and a multiplicity of preferably uniformly peripherally spaced ports 35 of reduced diameter is formed to open from the space 34 through the face 33. Preferably, a continuous gasket 36 is interposed between the floor portion 31' of the seating ring 31 and said remote face of the washer 32 effectively to seal the open end of the plenum space 34. For optimum performance, the sealing face 25 should be uninterrupted and the sealing face 33 should be uninterrupted except for the ports 35.

At one or more points in its periphery, the washer 32 is formed with a radially outwardly opening port 37 in which is received a nipple fitting 38 to which is connected a conduit 39 leading to a source (not shown) of fluid under pressure. When the seal of the present invention is used in a vehicle wheel assembly, a fluid pump (not shown) may be driven by the conventional engine of the vehicle, or by a separate prime mover, to supply fluid under pressure through the conduit 39 to the plenum space 34. Preferably, a fluid pressure reservoir will be interposed between the pump and the conduit 39, and suitable valving mechanism may be provided. Since the details of the means whereby fluid under pressure is supplied to the plenum space 34 form no part of the present invention but may consist of well-known elements cooperating in a conventional manner to supply such fluid, those details are not illustrated and will not be specifically described.

The individual, and the cumulative, effective areas of the ports through which fluid emanates from the plenum space 34 must, for optimum performance, be so proportioned to the pressure maintained in the space 34 as to accomplish the function which is to be explained hereinafter; and I have found that this may be conveniently accomplished by making the ports 35 oversize and mounting in each port a tubular rivet 40 of ductile metal. Each such rivet may be formed with an enlarged head 41 receivable in a recess 42 in the face 33, the rivet stem extending through the port 35 into the plenum space 34 wherein the distal end of the rivet may be expanded as at 43 to bear against the tapered surface through which the plenum space 34 merges with the port 35. Thus, the rivet is firmly anchored in its port. It will be apparent that such rivets may be very conveniently formed with accurately dimensioned orifices 44, thereby determining the effective area of the port 35 within which each such rivet is mounted.

With the seal parts assembled in the manner above described, it will be apparent that the spring 29 resiliently presses the sealing face 33 of the washer 32 into sealing engagement with the sealing face 25 of the brake drum 13, thereby preventing access of foreign material between those faces and into the chamber 24. This condition will continue for so long as the vehicle is stationary. When, however, the vehicle is to be moved, the above-mentioned pump will be operated to supply fluid (for instance, air) under pressure to the plenum space 34 whence such fluid can escape only through the orifices 44 of the ports 35. Since that air can escape from between the faces 25 and 33 only by separating those faces, the washer 32 will thereby be moved toward the right, as viewed in FIGS. 1 and 3, against the tendency of the spring 29. The escaping air will flow radially outwardly between those faces to establish a peripherally continuous flowing-fluid barrier against the access of foreign material to the space between said faces and to the chamber 24, and will also flow radially inwardly between the separated faces to build and maintain a superatmospheric pressure in said chamber 24. In service tests, it has been fully established that the flowing-fluid barrier effectively prevents water, even under a static head of as much as ten feet, from entering the chamber 24, and likewise protects that chamber against the ingress of air-suspended grit in the ambient atmosphere. It will be apparent, however, that since the face 33 is wholly out of contact with the face 25 at all times when the face 25 is rotated with the brakedrum 13, the washer face 33 is never subjected to friction (except for that of the fluid barrier) and therefore is protected against wear.

It will be obvious that, so long as the flow of fluid under pressure in the manner above-described is continued, the face 33 will be held out of contact with the face 25 in spite of the bias produced by the spring 29. When, however, the flow of fluid to the plenum space 34 is discontinued, by valving means or by shutting down the above-mentioned pump, the spring 29 will promptly return the washer face 33 to sealing engagement with the face 25. This will occur, of course, only when the vehicle has stopped so that there is no relative motion between the engaged sealing faces.

The ports 35 must be of such effective diameter and so perimetrally spaced that, when fluid under selected pressure is supplied to space 34, emergence of that fluid through said ports will force washer face 33 away from contact with face 25 and establish a perimetrally continuous curtain of such fluid to fill the intervening space between said faces and to flow radially from that intervening space between said faces and to flow radially from that intervening space at a velocity such as to bar entry of foreign material to that intervening space. I presently believe the minimum effective diameter of each such port to be 0.015 inches and I believe that the effective individual port diameter should not exceed 0.500 inches, depending largely on the perimetral dimension of the washer 32. The number of such ports and the perimetral spacing therebetween likewise is largely controlled by the perimetral dimension of the washer, though I believe that the number of such ports should be at least four and such number should always be such that adjacent ports are close enough so that the increment of fluid emerging from each port will spread perimetrally far enough to meet or overlap the increment emerging from each adjacent port. The pressure maintained in the plenum space 34 must be sufficient to establish and maintain such a continuous curtain.

In one typical assembly which has been tested, the washer 32 had a 3¼-inch diameter and its face 33 was formed with four ports spaced 90° apart and each having an effective diameter of 0.020 inches. With a pressure of 80 p.s.i. maintained in the plenum space 34, perfect theoretical operation was achieved under highly adverse environmental conditions. When an otherwise identical washer provided with eight 0.020-inches diameter ports was used under the same conditions, no significant operational change was noted.

I presently believe that, for seal diameters up to 6 inches, six 0.020 inches -inches ports will suffice, that 12 such ports should be provided in washers having diameters between 6 inches and 12 inches and that 18 or more such ports should be used in still larger washers.

The number of such ports may be decreased in the diameter of each port is increased and the requisite operating pressure will vary generally inversely with the cumulative effective area of the ports. I presently believe that such pressure may lie anywhere in the range between 10 p.s.i. and 130 p.s.i., depending to some extent upon the design characteristics of the seal, but that 80 p.s.i. will be an optimum value with most such seals.

Figure 6:
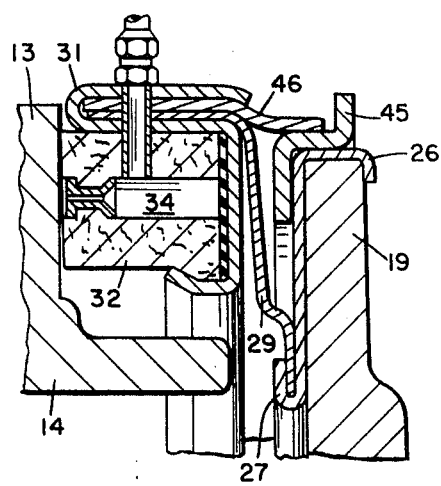
FIG. 6 is a view similar to FIG. 3 but illustrating a modification.

In some instances, it may be desirable to provide means for limiting the degree of separation between the faces 33 and 25. In FIG. 6, I have shown such means comprising a stop element 45 interposed between the carrier means 26 and an element 46 supported by the seat ring 31. The stop means 45 may be a continuous ring or it may constitute a plurality of separate elements; and it may be secured either to the carrier 26 or to the element 46.

Figure 7:
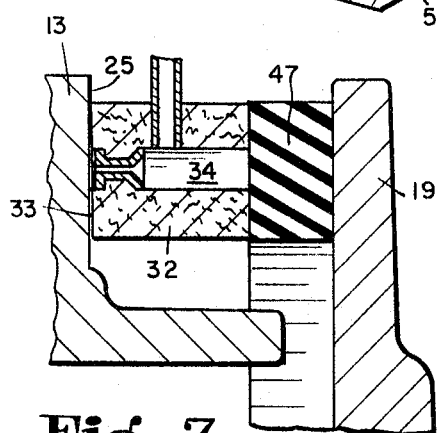
FIG. 7 is a similar view illustrating a further modification.

In FIG. 7, I have shown a further modification of the invention in which the spring 29 and the seat ring 31 together with the gasket 36 are replaced by a continuously annular compressible block or ring 47 of rubberoid material. The material of the block 47 is axially resiliently compressible so that it not only acts as a seal for the open end of the plenum space 34 but also yieldably biases the washer face 33 toward sealing engagement with the face 25 of the brakedrum 13.

It has been stated above that inherently the material of the brake linings 14 must be erodible and that, during the operation of a wheel assembly such as that illustrated, material will be work from the active faces of said linings to accumulate, in discrete, particulate and fluent condition, in the chamber 24. Such accumulation, if permitted to continue, could interfere with brake operation and could, in fact, interfere with wheel balance. Therefore, in vehicle wheel assemblies of the character illustrated in FIGS. 1—7, I presently believe that it will be desirable to provide scavenger means whereby such material will be periodically discharged from the chamber 24; and such scavenger means is indicated generally by the reference numeral 50 in FIGS. 1 and 5.

Where such means is to be used, an internally threaded port 51 is formed in the ring 19, preferably at a point below the axle 10, and a valve housing 52 having a reduced, externally threaded stem formed with an inlet port 53 therein, is threadedly seated in said port. The housing 52 defines a cavity 52' within which is provided a valve seat which, in the illustrated embodiment of the invention, consists of an O-ring 54 against which a ball 55 may close. The outer end 56 of the housing 52 is externally threaded for the reception of a cap 57 and a spring 58 is compressed, within the housing cavity 52', between said cap and the ball 55 to hold said ball yieldably against the O-ring 54.

As had been stated above, when fluid under pressure is supplied to the plenum space 34, part of that fluid will escape to the interior of the chamber 24 whereby a superatmospheric pressure is built up in that chamber. The spring 58 is so calibrated that the ball 55 is held in closing relation against its seat 54 until the pressure within the chamber 24 reaches a predetermined value, whereupon the ball 55 will be moved away from its seat to permit air to escape through the passage 53, carrying with it entrained discrete solids or other fluent material, until the pressure within the chamber 24 falls to the value for which the spring 58 is calibrated.

The cap 57, of course, is ported to permit fluid, and entrained solid material, to escape from the cavity 52'. I presently believe that some advantage will be achieved through the illustrated reverse passage 59 in the cap 57, which acts as a trap by the accumulation of liquid therein. Of course, some moisture will be present in the air which enters the chamber 24; and as that air escapes past the ball 55, some condensation will occur and that condensation will accumulate in the bight of the reverse passage 59. Also, at times, moisture from outside the assembly will tend to accumulate in the passage 59. It is to be understood, however, that in some installations, this reverse passage feature may be found to be unnecessary, and that my invention is by no means limited thereto.

Figure 8:
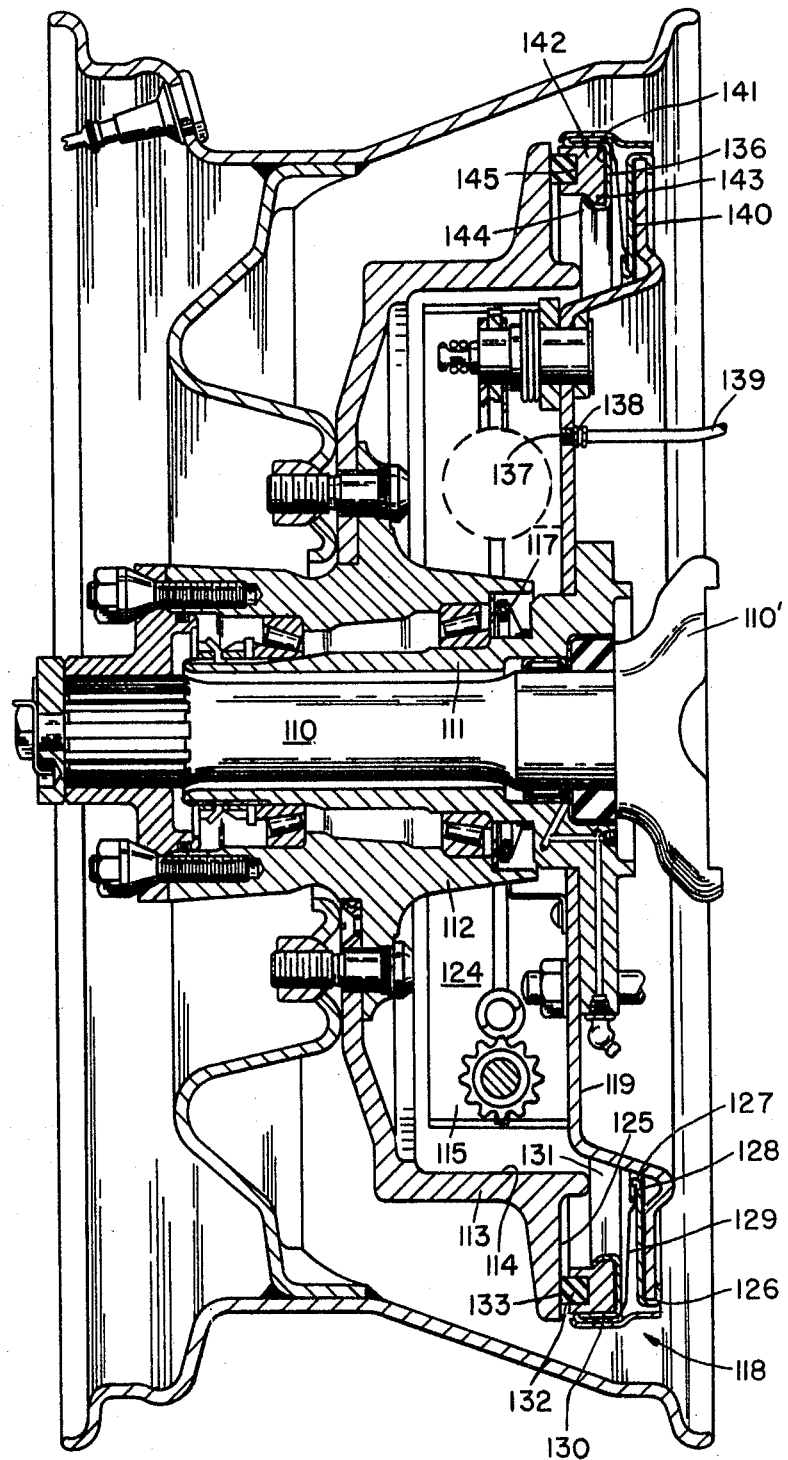
FIG. 8 is a view similar to FIG. 1 but showing a modified form of a seal.

In FIG. 8, I have illustrated a slightly different wheel structure and a modified form of seal assembly which has been found to perform satisfactorily under most conditions to protect a vehicle wheel brake assembly against access of foreign material, including water, by the establishment of a perimetrally continuous, radially outwardly flowing curtain or barrier of air under pressure, emanating from the chamber in which the brake parts are enclosed and between the cooperating sealing faces, which faces are in sealing contact at times when the vehicle is not in operation, but are minutely separated at times when the wheels are rotating, whereby friction between the seal parts is substantially obviated.

In this form of the invention, a rotating axle 110 carrying an element 110' of a universal joint penetrates a stationary axle housing 111 A wheel hub 112 is rotatably supported from said housing 111 through suitable bearing means and a brakedrum 113 is concentrically carried on said hub. Brakeshoes 115 provided with conventional lining of erodible material are mounted, in accordance with conventional practice, for selective frictional engagement with the internal surface 114 of the brakedrum 113, said shoes with their conventional operating means being supported from an imperforate mounting ring 119 secured to the housing 111. Suitable seal means 117, desirably of the illustrated construction, between the sleeve 111 and the hub 112, together with my nonfriction seal means indicated generally by the reference numeral 118, cooperate with the parts heretofore described to define a chamber 124 fully enclosing the shoes 115 and the cooperating brakedrum surface 114.

The outer rim of the brakedrum 113 is formed to provide a truly flat, planar sealing face 125. In opposition to said face, there is mounted on the rim of the ring 119 a carrier means 126. At its radially inward rim, said carrier means is formed to provide a rebent portion 127 gripping and supporting the inner perimetral edge or rim portion 128 of a frustoconical spring 129, the outer perimetral edge or rim portion 130 of which supports a seat ring 131 carrying an annular washer 132. The spring 129 is so proportioned and designed that, when the parts are in assembled condition, said spring is flexed from its equilibrium condition so that it constantly yieldably urges the sealing face 133 of the washer 132 into sealing engagement with the sealing face 125 of the brakedrum 113.

The composition of the washer 132 may be similar to that of the washer 32 described hereinabove, and its sealing face 133, in use, should conform quite accurately to the sealing face 125 of the brakedrum. Preferably, that sealing face will initially be inclined or bevelled, and then will be "run in" in the manner described in the discussion of the washer 32.

At one or more points, the ring 119 is formed with a port 137 receiving a fitting 138 which is connected, by conduit means 139, to a source (not shown) of clean, dry air under pressure. Such source may be of the character hereinbefore described, and it will be so constructed and arranged that, whenever the wheels of the vehicle are to be rotated, air will be supplied to the chamber 124 in such volumes and under such pressure that, acting upon the internal face of the spring 129, it will overcome the resilient force of that spring, flexing it further to move the washer face 133 out of engagement with the brakedrum face 125. Thus, air will be permitted to escape from the chamber 124 in the form of a perimetrally continuous, axially thin curtain or barrier stream. Since the faces 133 and 125 are out of contact during rotation of the brakedrum, they are relieved from all frictional wear; but the flowing air curtain effectively prevents access of foreign material, including water, to the chamber 124 and thus protects the brake parts against the damaging effects of such foreign material.

In this case, because of continuous turbulence within the chamber 124, the debris resulting from brake lining erosion has no opportunity to accumulate in that chamber, but is scavenged from the chamber, by entrainment with the flowing air, substantially instantaneously as it is produced. Therefore, no separate means for accomplishing the scavenging effect is required.

While a solid washer of suitable material, similar to that shown at 32 in the previously described forms of my invention may be used in this form, I prefer to use the composite construction illustrated in FIG. 8. As there shown, the seat ring 131 is formed to provide a perimetral channel 141 in which is received a metal ring 142, preferably having a radially inwardly extending toe 143 over which is bent a flange 144 at the inner perimeter of the ring 131. The axially inner end of the ring 142 is formed with a continuous annular groove 145 in which is seated the washer 132, per se, whereby, in case of damage, said washer may be readily removed and replaced.

Preferably, a gasket 136 is received in the channel 141 at the base of the ring 142, and a gasket 140 is interposed between the main body of the carrier 126 and the adjacent face of the ring 119.

Figure 9:
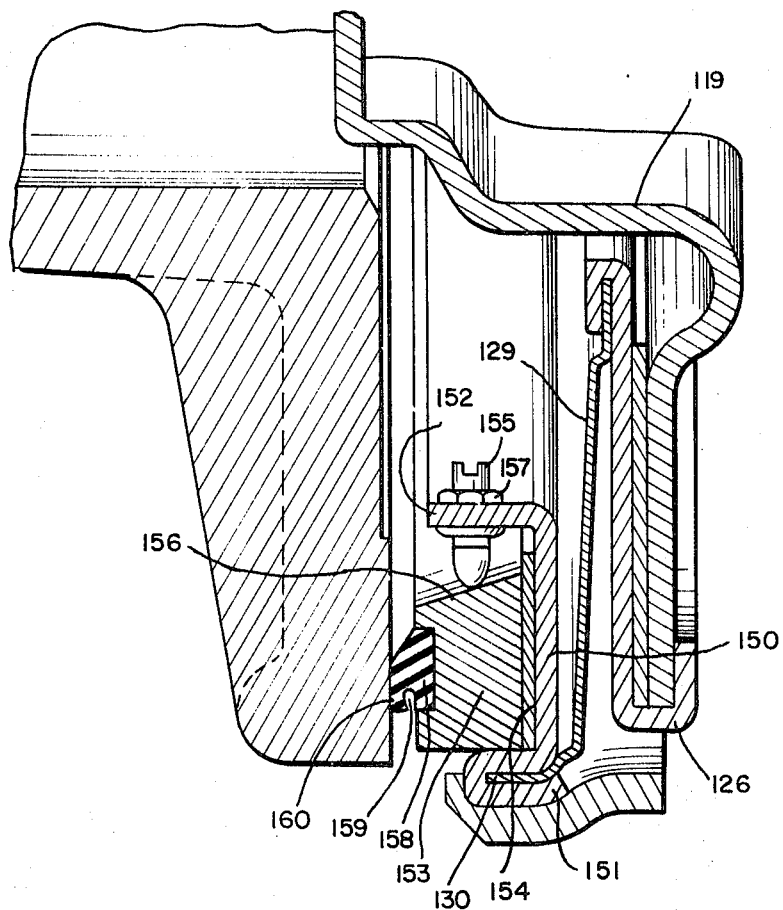
FIG. 9 is a view similar to FIG. 3 but illustrating a preferred form of seal in which the sealing washer is lipped to provide a hinging action and is mounted in a carrier ring which is readily removable from the assembly.

FIG. 9 illustrates certain refinements in the seal of the present disclosure. In that figure, the mounting ring 119, the carrier means 126 and the frustoconical spring 129 are substantially identical with the corresponding parts illustrated in FIG. 8. The seat ring 131 of FIG. 8, however, is replaced by a seat ring 150 of relatively heavy stock, the outer perimetral rim thereof being folded over as at 151 to grip the outer perimetral edge or rim portion 130 of the spring 129 and the inner peripheral rim of which is upturned, as at 152. The ring 150 thus provides a base or seat intermediate its substantially parallel rim portions for supporting a ring 153 quite similar to the ring 142 of FIG. 8, a gasket 154 preferably being interposed between said base and said ring 153, as shown.

At a plurality (preferably three) of peripherally equally spaced points, the rim 152 is formed with apertures internally threaded for the reception of gripper screws 155 each of which is formed to provide a part spherical nose engageable with a camming surface formed on a radially inwardly extending toe 156 on the carrier ring 153. Each screw 155 is provided with a lock washer 157 or other anchoring means for firmly retaining such screw in adjusted position. Thus, it will be seen that, while the seat ring 150 is substantially permanently supported from the mounting ring 119, the carrier ring 153 may be readily removed for repair or replacement by simply backing away the screws 155. When the same, or a new, carrier ring 153 is entered in the seat ring 150, the screws 155 may be advanced to engage their noses with the camming surface of the toe 156 whereupon, after adjustment of the anchoring means 157, the carrier ring 153 will be firmly, but readily removably, secured in place on the seat ring.

This form of mounting for the washer means of the seal is highly advantageous in normal vehicle maintenance, since it permits ready replacement of the washer element of the seal. Perhaps more importantly, however, it provides for easy removal of the washer element from the assembly in case a disabled vehicle must be towed for long distances, thereby guarding against destruction of the seal during continued rotation of the vehicle wheel with the washer element resiliently pressed against the cooperating surface on the brakedrum. Obviously, if the wheel of FIG. 8 is dismounted, the screws 155 will thereby be exposed for ready manipulation so that the carrier ring 153 may be withdrawn from the seat ring 150 whereafter, upon remounting the wheel, the vehicle can be towed without damage to the seal.

While the specific form of washer 132 illustrated in FIG. 8 may be used in the assembly of FIG. 9, I have illustrated therein a different form of washer 158. The washer 158 may be molded from suitable rubberoid material which is inherently resiliently compressible and flexible. As shown, the washer 158 is formed to provide a flat base receivable in the socket of the carrier ring 153, and is axially thinner near its inner edge than near its outer edge. An annular notch or groove 159 is formed in the thickened outer edge of the washer to define a resiliently flexible lip 160 which will first engage the cooperating surface on the brakedrum under the influence of the spring 129 and which will be flexed, to a greater or lesser degree, to define a sealing area of engagement of variable radial extent.

When this form of washer means is utilized, the "run in" referred to above is found to be unnecessary since the resiliently flexible lip 160 will conform to minute variances or accidental defects in the cooperating surface of the brakedrum.

I claim as my invention:

1. In a rotary, fluid-flow seal for sealing a housing providing mating parts, one of which is rotatable relative to the other, a seat member rotationally fixed relative to one of such parts and a washer member rotationally fixed relative to the other of such parts, said members having mating, perimetrally continuous, sealing faces, an annularly continuous frustoconical spring supporting one of said members and constituting a portion of a wall of said housing with its opposite surfaces exposed respectively to the interior of said housing and to the circumambient atmosphere, said spring constituting means yieldably biasing said one member axially toward the other member to press said sealing faces into mutual sealing contact, and means for connecting the interior of said housing to a source of fluid under pressure, said means being effective, at times, to establish and maintain a super atmospheric pressure within said housing and to overcome said spring and thereby separate said sealing faces to establish and maintain a continuous, radially outward flowing-fluid barrier against access of foreign material between said sealing faces to the interior of said housing.

2. In a rotary, fluid-flow seal for sealing a housing which comprises a rotationally stationary part and a rotatable part, the rotatable part being provided with an annular sealing face, a continuous, generally frustoconical spring supported from said rotationally stationary part and concentric with the axis of rotation of said rotatable part, a continuous, annular washer supported from said spring and having a sealing face concentric with the axis of rotation of said rotatable part and presented toward the sealing face of said rotatable part, said spring constituting a portion of the wall of said housing with its opposite faces exposed, respectively, to the interior of said housing and to the circumambient atmosphere and acting yieldably to press the sealing face of said washer into sealing contact with the sealing face of said rotatable part, and external means for supplying gaseous fluid under pressure to the interior of said housing to establish and maintain, throughout periods of rotation of said rotatable part, a superatmospheric pressure within said housing acting upon said spring to separate said sealing faces and to establish and maintain a peripherally continuous barrier of outwardly flowing gas to prevent access of material to the interior of said housing while said sealing faces are so separated.

3. The seal of claim 2 in which the inner peripheral edge region of said spring is fixed relative to said rationally stationary part and said washer is fixed relative to the outer peripheral edge region of said spring.

4. The seal of claim 3 in which the outer peripheral edge region of said spring is turned axially toward said sealing face of said rotatable member, and carrier means supported from said axially turned region of said spring and supporting said washer.

5. The seal of claim 1 including manipulatable means providing a readily separable connection securing said washer member in place on said biasing means.

6. The seal of claim 5 in which said washer member is a continuous ring of resiliently deformable, rubberoid material formed to provide a resiliently flexible, radially extending lip constituting a portion of its sealing face and yieldable in a direction away from said seat member.

7. The seal of claim 5 in which said manipulatable means comprises a carrier ring carrying said washer member, and at least three radially shiftable retainer elements supported from said biasing means and engageable with said carrier ring at substantially equiangularly spaced points about the periphery thereof to secure said carrier ring removably to said biasing means.